United States Patent
Hosaka et al.

(10) Patent No.: US 6,370,107 B1
(45) Date of Patent: Apr. 9, 2002

(54) RECORDING MEDIUM AND RECORDING DEVICE

(75) Inventors: Sumio Hosaka, Nishitama-gun; Hajime Koyanagi, Koshigaya; Atsushi Kikukawa, Higashimurayama; Kenchi Ito, Kokubunji; Kimitoshi Etoh, Hachioji, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/237,240

(22) Filed: Jan. 26, 1999

(30) Foreign Application Priority Data

Jan. 28, 1998 (JP) .......................................... 10-015368

(51) Int. Cl.$^7$ ................................................. G11B 7/24
(52) U.S. Cl. .................................. 369/275.4; 369/275.3
(58) Field of Search ........................... 369/275.4, 275.2, 369/275.3, 275.1, 13, 44.26, 44.29, 275.5, 116, 124, 283, 14, 53.41, 44.34, 44.27, 44.28, 47.15, 53.11

(56) References Cited

U.S. PATENT DOCUMENTS

| | | | |
|---|---|---|---|
| 4,027,330 A | | 5/1977 | Maslowski et al. |
| 5,038,322 A | | 8/1991 | Van Loenen |
| 5,155,715 A | | 10/1992 | Ueyema et al. |
| 5,396,483 A | | 3/1995 | Matsuda et al. |
| 5,436,448 A | | 7/1995 | Hosaka et al. |
| 5,481,530 A | * | 1/1996 | Ueda et al. ............... 369/275.1 |
| 5,537,372 A | | 7/1996 | Albrecht et al. |
| 5,694,379 A | * | 12/1997 | Aratani et al. ................. 369/13 |
| 5,808,977 A | | 9/1998 | Koyanagi et al. |
| 5,822,285 A | | 10/1998 | Rugar et al. |
| 5,844,882 A | * | 12/1998 | Yoshida et al. ........... 369/275.4 |
| 5,856,967 A | | 1/1999 | Mamin et al. |
| 5,856,969 A | * | 1/1999 | Nishiyama ................ 369/275.4 |
| 5,936,933 A | * | 8/1999 | Miyamoto et al. ........ 369/275.3 |
| 5,940,364 A | * | 8/1999 | Ogata et al. .............. 369/275.4 |

FOREIGN PATENT DOCUMENTS

| | | |
|---|---|---|
| DE | 24 49 136 | 10/1975 |
| JP | 9-134552 | 5/1997 |

OTHER PUBLICATIONS

H.J. Mamin et al, "High Density Data Storage Using Micromachined Probes", Extended Abstracts of the 1997 International Conference on Solid State Devices and Materials, Hamamatsu, 1997, pp. 222–223.

Physical Review Letters, vol. 56, No. 9, Mar. 3, 1986, "Atomic Force Microscope", Binnig et al, pp. 930–933.

Applied Physical Letters, vol. 69, No. 20, Dec. 30, 1996, "Nanoscale Replication for Scanning Probe Data Storage", B.D. Terris et al, pp. 4262–4264.

* cited by examiner

*Primary Examiner*—Ali Neyzari
(74) *Attorney, Agent, or Firm*—Mattingly, Stanger & Malur, P.C.

(57) ABSTRACT

A recording disk has a surface provided with guide grooves for controlling the position of a recording head, and recording bits formed in the guide grooves for high-density recording. The recording bits have the shape of a tadpole in a plane. The width Ws of the recording bits is greater than the width Wg of the guide grooves. An AFM probe serving as a recording head travels along the guide grooves without running off the guide grooves. When a tip part of the AFM probe coincides with the recording bit, the tip part drops deep into the guide groove, whereby the recording bit is detected.

13 Claims, 4 Drawing Sheets

FIG. 2A
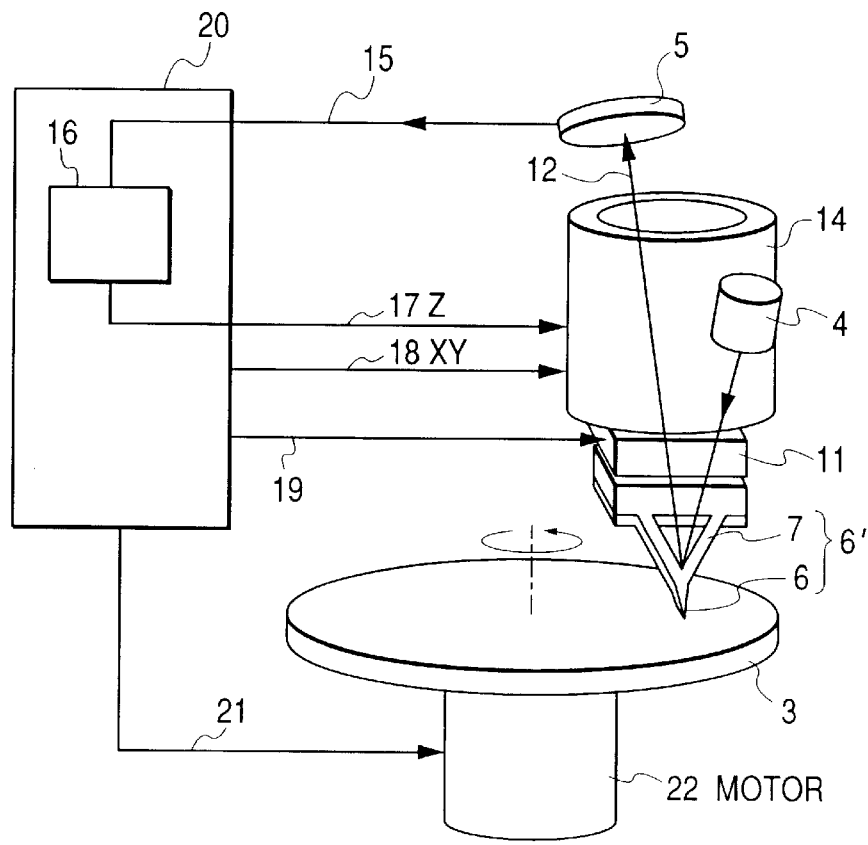
FIG. 2B
a–a' CROSS-SECTION
ON RECORDED BIT
IN A CASE OF NO RECORDED BIT
PENETRATION OF THE PROBE
FIG. 2C
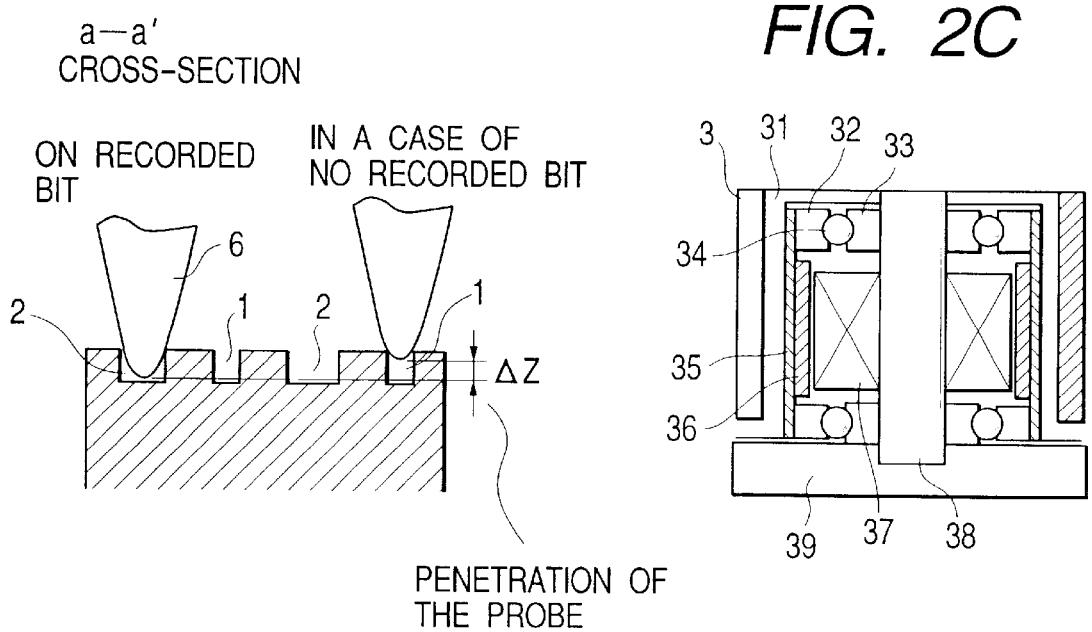

RECORDING MEDIUM AND RECORDING DEVICE

BACKGROUND OF THE INVENTION

1. Field of the Invention

The present invention relates to a recording medium and a recording device and, more particularly, to a recording disk of 0.5 μm or below in track width or track pitch, and a recording device for recording information on the recording disk.

2. Description of the Related Art

Recently, computerized society has made remarkable advancement and there has been a demand for the development of techniques that enables the storage of an increased information volume. Efforts are being made in the field of researches into disk type file memories for the reduction of the diameter of recording bits and the length of recording tracks. It is expected that track length for magnetic recording will shrink from its present length of about 2 μm to 1 μm in the year 2000 and to 0.5 μm or below in the year 2005. A sample servo method is used for magnetic recording, and a sample servo method using V-grooves is used for optical recording. The former does not use any guide grooves, while the latter uses guide grooves, in which recording bits are formed between the adjacent guide grooves. When tracks of 0.5 μm or below in track length or track pitch are used for ultrahigh-density recording, the nonrepeatable radial positioning error in a disk rotating mechanism is large and the sample servo method can not be used. The recording medium for optical recording has recording bits formed between the adjacent guide grooves.

A high-density read-only memory (ROM) using techniques concerning an atomic force microscope (AFM) disclosed in Physical Review Letters, Vol. 56, pp. 930 to 933 (1986) is proposed in Appl. Phys. Lett., Vol. 69, pp. 4262 to 4264 (1996). This ROM is formed on a recording disk provided with recording tracks arranged at a track pitch of 0.1 μm. The recording disk is not provided with any guide grooves and is provided with only concave recording bits.

The conventional recording disks without any guide grooves or those provided with guide grooves and recording bits formed between the adjacent guide grooves have the following problems.

When a recording disk of 0.5 μm below in track length or track pitch is used for ultrahigh-density recording, a tracking control system is affected by the nonrepeatable radial positioning error in a disk rotating mechanism. It is said that nonrepeatable radial positioning error in the operation of a disk rotating mechanism employing ball bearings is about 200 nm, while the same in the operation of a disk rotating mechanism employing liquid bearings is in the range of about 50 to 20 nm. Accordingly, it is said that a practical maximum track length for the sample servo system is about 10 times the nonrepeatable radial positioning error. If track length is 0.5 μm or below the sample servo system is infeasible and a continuous servo system must be used.

The guide grooves of a disk having recording bits formed between the adjacent guide grooves, such as a disk for optical recording, are useless spaces and it is important to eliminate such useless spaces.

SUMMARY OF THE INVENTION

Accordingly, it is an object of the present invention to solve the technical problems in the prior art and to provide a recording medium that enables tracking of 0.5 μm or below.

Another object of the present invention is to provide a recording device using the recording medium of the present invention.

With the foregoing object in view, the present invention provides a recording medium, such as a recording disk, provided with guide grooves for controlling the position of a recording head, and recording bits formed in the guide grooves for high-density recording. Thus, the recording disk of the present invention is provided in its major surface with guide grooves for controlling the position of a probe (head), and recording bits formed in the guide grooves, in which the guide grooves are 0.5 μm or below in width and 0.5 μm or below in pitch. The recording bits may be concave or convex with respect to a direction perpendicular to the guide grooves, and the center of the recording bits may coincide with the center of the guide grooves, the center of the recording bits may be dislocated from the center of the guide grooves, the recording bits may be different in depth from the guide grooves, and the recording bits may have a diameter different from the width of the guide grooves.

The present invention provides also a recording device for driving the recording medium as mentioned above, provided with a disk rotating mechanism employing ball bearings or liquid bearings.

A recording device in accordance with the present invention is able to write data to a recording disk according to the present invention at a track length of 0.5 μm or below. The recording device is a high-density recording device employing an AFM as a recording head. Lateral forces acting on a probe included in a recording head are measured and the probe is controlled by a servocontrol system for tracking control so as to lie on the center of the guide groove. In the recording disk, the width Ws of the recording bits is greater than the width Wg of the guide grooves. Therefore, the probe is able to identify the recording bits through the detection of an atomic force perpendicularly acting on the probe. The depth of sinking of the probe into the guide groove when the probe travels along the guide groove is less than that of sinking of the probe into the recording bit. When the depth of sinking of the probe into the guide groove increases by an increment corresponding to the difference between the depth of sinking of the probe into the recording bit and that into the guide groove when the probe moves from the guide groove into the recording bit, a recording signal is provided. Thus, information can be erased, and written to or read from a desired position without being affected by nonrepeatable radial positioning error even if a conventional drive system employing ball bearings or liquid bearings is used, if the recording disk of the present invention is used. The use of the recording disk of the present invention improves the reliability of ultrahigh-density recording.

The recording disk of the present invention enables ultrahigh-density recording in a high recording density of 1 Tbit ($10^{12}$ bits)/in.$^2$.

BRIEF DESCRIPTION OF THE DRAWINGS

The above and other objects, features and advantages of the present invention will become more apparent from the following description taken in connection with the accompanying drawings, in which:

FIG. 2A is a diagrammatic perspective view of a recording device for use in combination with the recording disk shown in FIGS. 1A and 1B for ultrahigh-density recording;

FIG. 2B is a sectional view of assistance in explaining the position of a probe relative to a recording disk;

FIG. 2C is a sectional view of a disk rotating mechanism employing ball bearings;

DESCRIPTION OF THE PREFERRED EMBODIMENTS

Embodiments of the present invention will explained in detail as follows.

Figure 1A:
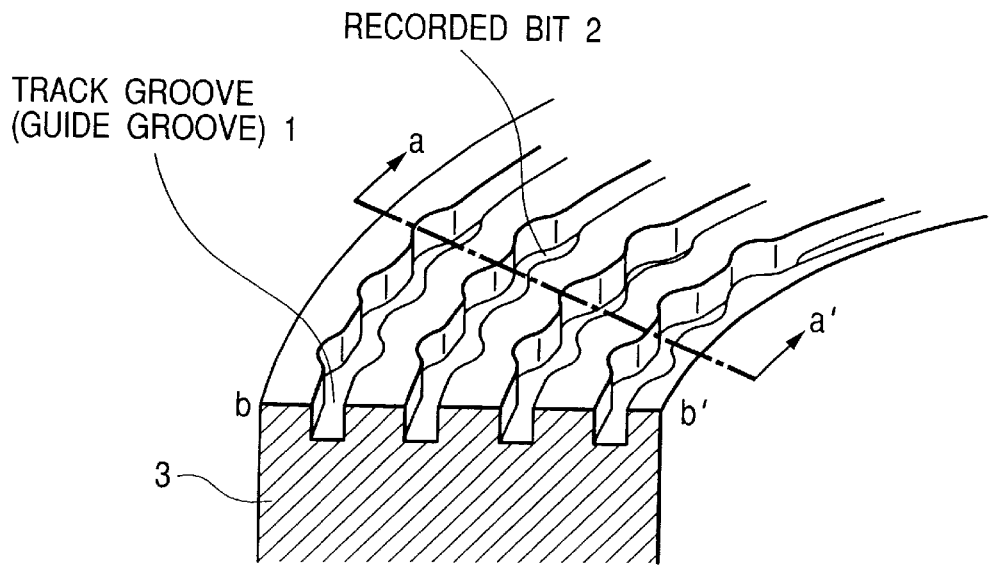
FIG. 1A is a fragmentary perspective view of a recording disk in a first embodiment according to the present invention.
Figure 1B:
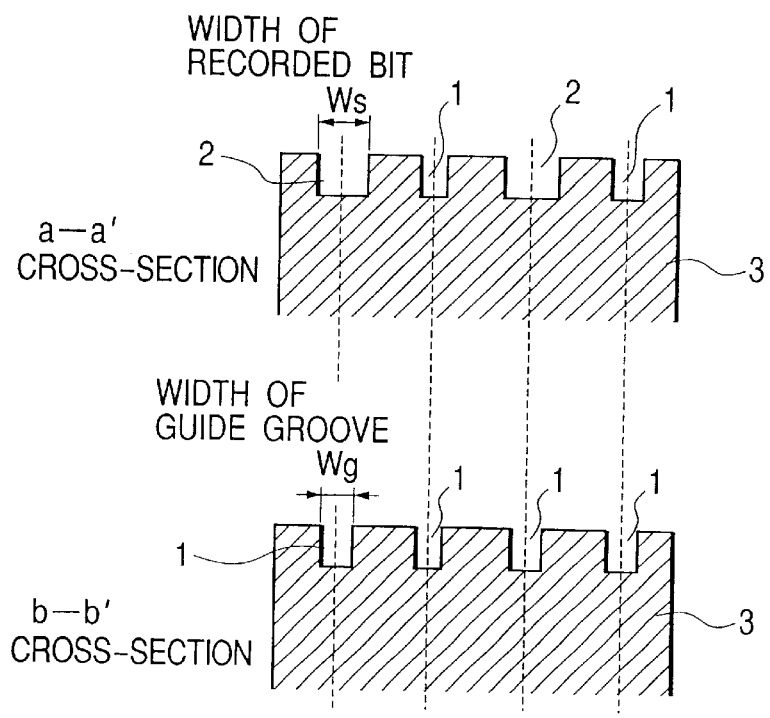
FIGS. 1B are sectional views taken on line a–a' and on line b–b', respectively, in FIG. 1A.

Referring to FIGS. 1A and 1B, a recording disk 3 has a surface provided with guide grooves 1 for controlling the position of a recording head, and recording bits 2 formed in the guide grooves 1 for high-density recording. FIG. 1A is a perspective view of the recording device, and FIGS. 1B are sectional views taken on line a–a' and on line b–b', respectively, in FIG. 1A. The guide grooves 1 are U-shaped. The recording bits 2 have the shape of a tadpole in a plane. The width Ws of the recording bits 2 is greater than the width Wg of the guide grooves 1. An AFM probe 6' (FIG. 2A) serving as a recording head travels along the guide grooves 1 without running off the guide grooves 1. The AFM probe 6' can be positioned with respect to a radial direction in an accuracy of 10 nm or below. When a tip part 6 of the AFM probe 6' coincides with the recording bit 2, the tip part 6 drops deep into the guide groove 1 as shown in FIG. 2B, whereby the recording bit 2 is detected.

Referring to FIG. 2A, a recording device in a second embodiment according to the present invention employs AFM techniques. The recording device comprises an AFM head, a disk rotating mechanism and a control system. The AFM head is provided with the AFM probe 6' having the tip part 6 and a cantilever arm 7 held at one end thereof, an optical lever detection system for detecting a force exerted on the tip part 6 of the AFM probe 6', a recording piezoelectric device 11, and an XYZ scanner 14 for controlling the tip part 6. The optical lever detection system comprises, as basic components, a laser light source 4, and a position detector 5 for detecting a light beam 12. Naturally, the recording device is provided with a rough control mechanism, probe advancing/retracting mechanism and a probe seek mechanism, which are omitted in FIG. 2A for simplicity.

Referring to FIG. 2C, the disk rotating mechanism comprises a motor 22, ball bearings and a disk table 31. The stator 37 of the motor 22 and the inner rings 33 of the ball bearings are fastened to a shaft 38 set on a base 39. A rotor has a cylindrical part 35 of iron fixedly fitted in the boss of the table 31. The outer rings 32 of the ball bearings and a magnet rotor 36 are mounted on the cylindrical part 35. Balls 34 are held between the outer ring 32 and the inner ring 33 of each of the ball bearings. The table 31 is able to rotate. Liquid bearings may be employed instead of the ball bearings. A liquid bearing can be formed by sealing a liquid between an outer ring and an inner ring respectively corresponding to the outer ring 32 and the inner ring 33 of the ball bearing. When the disk rotating mechanism is used, nonrepeatable radial position error is in the range of 20 to 200 nm. Highly reliable writing and reading operation can be achieved when the recording disk of the present invention is used in combination with the disk rotating mechanism of the present invention.

The recording disk 3 is supported on the table for writing, reading and erasing operations. A controller 20 receives a position signal 15, i.e., information about the position of the tip part 6 of the probe 6', provided by the position detector 5 upon the detection of a light beam 12, and executes a position control operation, a recording signal detecting operation and a write signal generating operation. The controller 20 includes a position control unit 16 which receives position information about the position of the tip part 6 of the probe 6', and executes a tracking control operation, and a position control operation for controlling the three-dimensional position of the tip part 6 of the probe 6'.

If the recording disk 3 is a ROM disk (read-only memory disk), the recording bits 2 are formed in all the guide grooves 1, and information is read by detecting the vertical movement of the probe 6'. If the recording disk 3 is a RAM disk (random-access memory disk), address information and system information are read through the detection of the probe 6', and information is recorded in data sections in which any recording bits 2 are not formed, information is erased, and information is read by a small magnetic head formed in the probe 6'. If the recording disk 3 is a WORM disk (write-once read-many disk), recording bits are formed in the data section by pressing a probe into the data sections to form the concave bits using nanoindentations. If a near field optical probe is used instead of the probe 6', ROMs, RAMs and WORMs can be realized. The probe 6' may be mounted on a slider.

Figure 3:
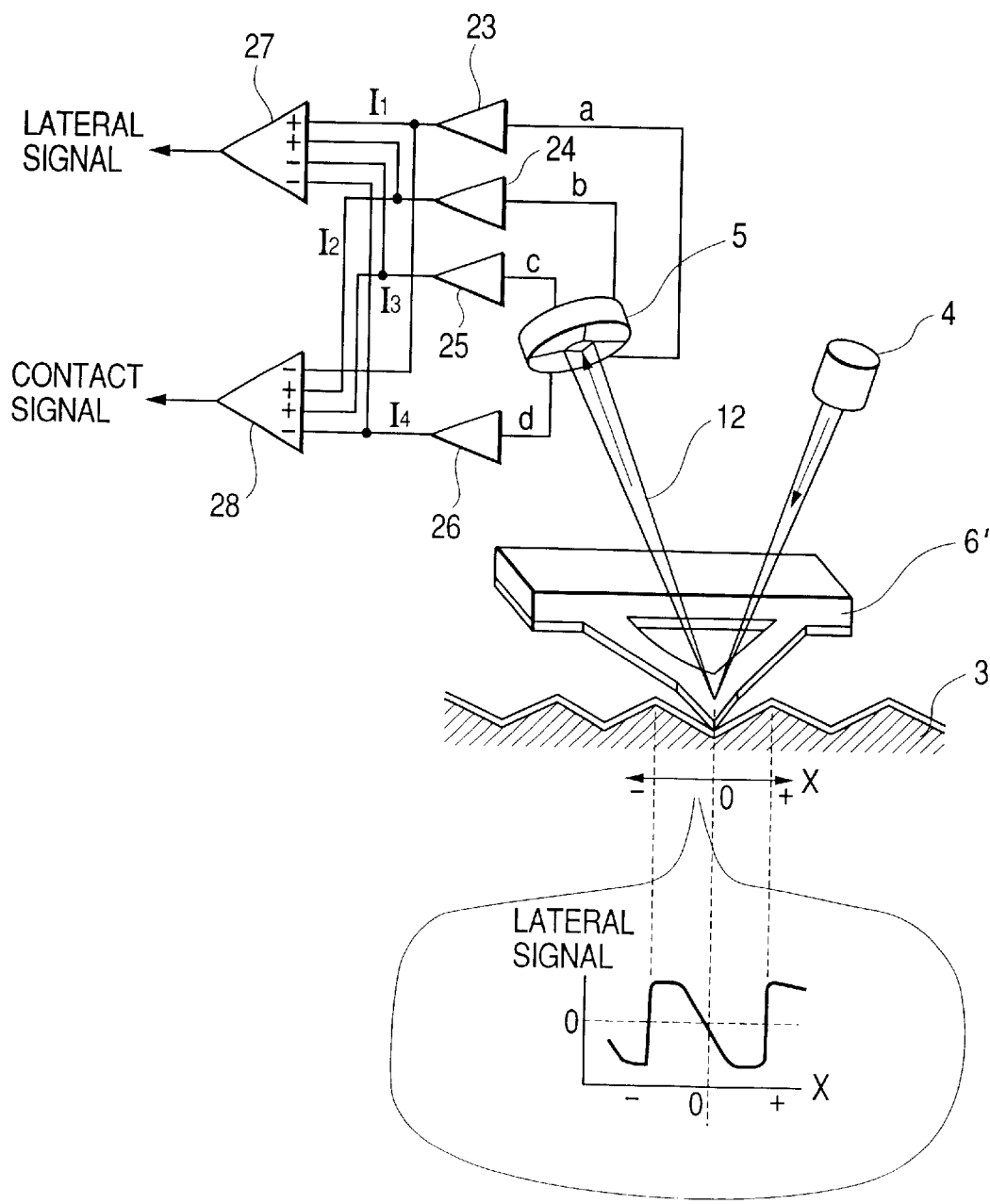
FIG. 3 is a diagrammatic view of assistance in explaining a tracking control operation and a reading operation.

FIG. 3 is a diagrammatic view of assistance in explaining a tracking control operation when a recording disk provided with guide grooves 1 of a V-shaped cross section is used. A laser beam 12 reflected by the back surface of the cantilever arm 7 falls on the position detector 5 having four photodetectors. The position detector 5 may be such as provided with photodetectors arranged in a two-dimensional arrangement. When the probe 6 is twisted by the guide groove, a lateral force (horizontal force) acts on the probe 6. This lateral force is determined by operating the output signals of the four photodetectors of the position detector 5 so as to determine a twisting direction. Thus, a lateral signal as shown in FIG. 3 is produced. The output signal of the position detector 5 is positive when the tip part 6 of the probe 6' moves in one direction from the center of the guide groove and is negative when the tip 6 of the probe 6' moves in the opposite direction from the center of the guide groove. This characteristic of the output signal of the position detector 5 is substantially linear when the tip part 6 of the probe 6' moves in the guide groove. The deviation of the tip part 6 of the probe 6' from the center of the guide groove is determined as the variation of the lateral force, the XYZ scanner 14 is controlled so as to keep the tip part 6 of the probe 6' always on the center of the guide groove.

When the tip part 6 of the probe 6' come to a position corresponding to the recording bit 2, the tip part 6 of the probe 6' sinks further into the recording disk 3, and the depth of sinking of the tip part 6 into the guide groove increases by an increment Δ Z as illustrated in FIG. 2B. The circuit shown in FIG. 3A generates a contact signal on the basis of the increment Δ Z. Vibrational motions of 10 kHz or below of the probe 6' are caused by a strain in the recording disk 3. The position control unit 16 controls the XYZ scanner 14 to control the position of the tip part 6 of the probe 6' with respect to a direction parallel to the Z-axis so that the tip part 6 of the probe 6' is in contact with the recording disk 3 at a constant contact pressure. The controller 20 decides that vibrations of the probe 6' at frequencies of 1 MHz or above are information signals, and processes the information signals for reading. Thus, information recorded in an ultrahigh density on the recording disk 3 of the present invention provided with recording tracks arranged at a track pitch of 0.5 μm or below can be read without causing errors even if a conventional disk rotating mechanism employing ball bearings or liquid bearings is used for rotating the recording disk 3.

Figure 4A:
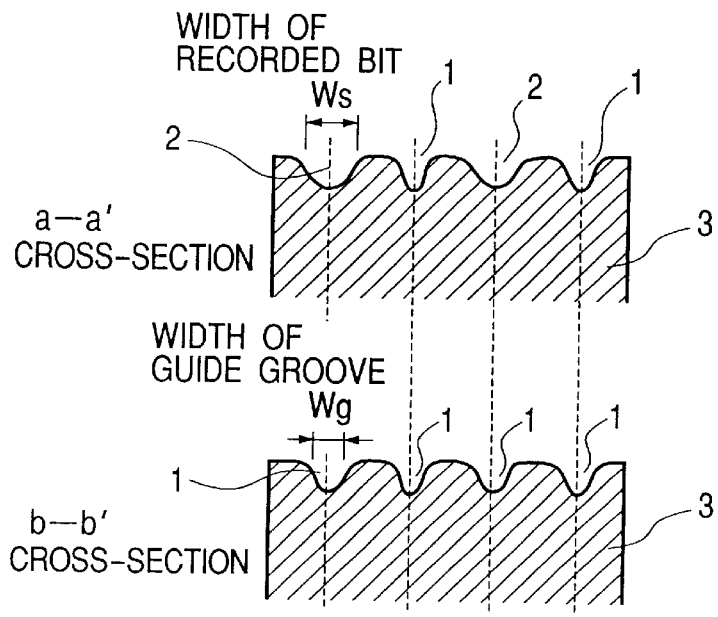
FIG. 4A is a sectional view of a recording disk in a second embodiment according to the present invention provided with guide grooves having a substantially V-shaped cross section rather than a U-shaped cross section.

Recording disks in further embodiments according to the present invention will be described below with reference to FIGS. 4A, 4B and 4C. Referring to FIG. 4A, a recording disk 3 in a second embodiment according to the present invention is provided with guide grooves 1 of a substantially V-shaped cross section rather than a U-shaped cross section. The guide grooves 1 are formed in such a shape when the same are formed by a conventional process, such as a replica process, an etching process or a lithographic process.

Figure 4B:
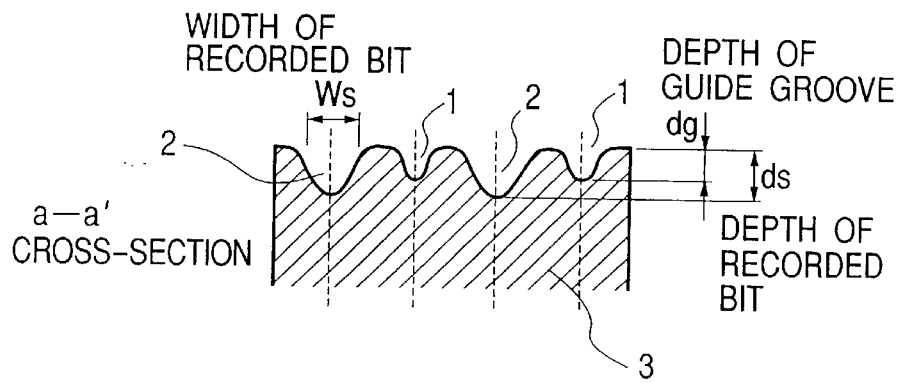
FIG. 4B is a sectional view of a recording disk in a third embodiment according to the present invention provided with recording bits of a depth different from that of guide grooves.

Referring to FIG. 4B, a recording disk 3 in a third embodiment according to the present invention is provided with guide grooves 1 and recording bits 2 of a depth greater than that of the guide groove 1. This recording disk 3 enables the enhancement of signal intensity, which improves the S/N ratio. A recording disk in a modification of the recording disk 3 shown in FIG. 4B may be provided with guide grooves and convex recording bits of a depth smaller than that of the guide groove. This recording disk can be formed by etching a surface of a disk blank with regions corresponding to the convex recording bits in the surface of the disk blank covered with a resist. The height of the convex recording bits can be detected more surely than the depth of the concave recording bits. If the diameter of the concave recording bits is smaller than that of the tip part of the probe, the tip of the tip part of the probe is unable to reach the bottom of the recording bits. The convex recording bits is free from such a problem and hence is capable of improving the S/N ratio.

Figure 4C:
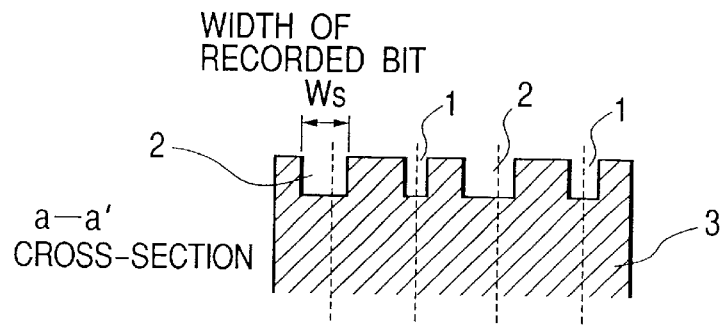
FIG. 4C is a sectional view of a recording disk in a fourth embodiment according to the present invention provided with guide grooves, and recording bits dislocated from the center of guide grooves.

Referring to FIG. 4C, a recording disk 3 in a fourth embodiment according to the present invention is provided with guide grooves 1 and recording bits 1 dislocated from the center of the guide grooves 1.

The recording disk may be formed of any suitable material. In most cases, the recording disk is formed of an organic material, such as a polycarbonate resin. The surface of the recording disk may be of a multilayer structure, and the bottom wall of the guide grooves and the side walls of the guide grooves may be formed of other materials, respectively.

The structure of the recording disk in accordance with the present invention may be applied only to the header (address part) and servo region of each sector on a conventional recording disk. Only guide grooves 1 may be formed in the rest of parts serving as data parts to use the recording disk for ultrahigh-density recording. In such a case, the servo region of a sector needs only a recording bit 2 for a clock. This can be used for write-once erasable recording. For example, when writing data to the grooves 1 of the data region of a polycarobonate recording disk by a force modulation recording method, the recording piezoelectric device 11 shown in FIG. 2 is driven to form recording bits 2 in the guide grooves 1 by applying pulsed force to the recording disk. The recording disk may be provided with a coating of a magnetic recording material, a magnetooptic material, a phase-changeable material or an organic dye recording material, and the coating may be covered with a protective film.

The guide grooves may partly be interrupted. The guide grooves may be formed in concentric circles or in a spiral. A magnetic head or a head provided with a near field optical probe may be employed instead of the AFM probe.

As is apparent from the foregoing description, according to the present invention, ultrahigh-density recording can be achieved with high reliability by a conventional disk rotating mechanism employing ball bearings or liquid bearings and apt to cause nonrepeatable radial positioning error (NRRE: nonrepeatable run-out error) even if the track length or the track pitch of the recording disk is 0.5 μm or below.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A recording disk having a surface provided with guide grooves formed at a track pitch less than 0.5 μm, and recording bits formed in the guide grooves, which constitute single continuous grooves;

wherein centers of the recording bits are displaced from a center of the guide grooves; and wherein information represented in the recording bits is encoded for detection by a detection movement that is perpendicular to said guide grooves while tracking along said guide grooves.

2. The recording disk according to claim 1, wherein the recording bits have a concave shape.

3. The recording disk according to claim 1, wherein the recording bits have a convex shape.

4. The recording disk according to claim 1, wherein the recording bits have a depth different from that of the guide grooves.

5. The recording disk according to claim 1 to be used in combination with a recording device using techniques relating to probe microscopes.

6. The recording disk according to claim 1, wherein the recording bits have a diameter different from the width of the guide grooves.

7. The recording disk according to claim 1, wherein the recording disk is formed of a polycarbonate resin.

8. The recording disk according to claim 7, wherein the recording disk has a surface coated with a magnetic material, a magnetooptic material, a phase change material or an organic dye recording material.

9. The recording disk according to claim 8, wherein the recording disk has a surface coated with a protective film.

10. The recording disk according to claim 9, wherein the guide grooves are formed in a spiral.

11. The recording disk according to claim 9, wherein the guide grooves are formed in concentric circles.

12. A recording device comprising the recording disk according to claim 1, and a disk driving mechanism including ball bearings.

13. A recording device comprising the recording disk according to claim 1, and a disk driving mechanism including liquid bearings.

* * * * *